US007518349B2

(12) United States Patent
Xu

(10) Patent No.: US 7,518,349 B2
(45) Date of Patent: Apr. 14, 2009

(54) CURRENT MULTIPLIER/DIVIDER-CONFIGURED FEED-FORWARD COMPENSATION FOR BUCK-MODE CONVERTER CONTROLLER WITH PROGRAMMED SWITCHING FREQUENCY

(75) Inventor: Jun Xu, McKinney, TX (US)

(73) Assignee: Intersil Americas Inc., Milipitas, CA (US)

( * ) Notice: Subject to any disclaimer, the term of this patent is extended or adjusted under 35 U.S.C. 154(b) by 348 days.

(21) Appl. No.: 11/427,000

(22) Filed: Jun. 28, 2006

(65) Prior Publication Data

US 2007/0279025 A1 Dec. 6, 2007

Related U.S. Application Data

(60) Provisional application No. 60/803,562, filed on May 31, 2006.

(51) Int. Cl.
*G05F 1/00* (2006.01)
*H03K 3/017* (2006.01)
*H03K 7/08* (2006.01)

(52) U.S. Cl. ............... 323/282; 323/288; 327/172; 375/238

(58) Field of Classification Search ............... 323/282, 323/288; 332/149; 327/110, 101, 131–135, 327/126–128, 172; 375/238
See application file for complete search history.

(56) References Cited

U.S. PATENT DOCUMENTS 7,256,623 B2 * 8/2007 Day et al. ............... 327/101
7,271,754 B2 * 9/2007 Maksimovic et al. ....... 341/152

OTHER PUBLICATIONS

Dallas Semiconductor, MAXIM, MAX5051, "Parallelable, Clamped Two-Switch Power-Supply Controller IC" Aug. 2003.
Texas Instruments, TPS40054, TPS40055, TPS40057, "Wide-Input Synchronous Buck Controller", SLUS593D, Dec. 2003, Revised Jun. 2005.
Texas Instruments, Application Report, SLUA 310, Apr. 2004, "Effect Of Programmable UVLO On Maximum Duty Cycle Achievable With The TPS4005x and TPS4006x Family Of Synchronous Buck Controllers".
On Semiconductor, CS51220, "Feed Forward Voltage Mode PWM Controller With Programmable Synchronization" Publication CS41220/D, pp. 1-16, Jan. 2002.
L. Calderoni et al, "Optimal Feed-Forward Compensation For PWM DC/DC Converters", Universita dell'Aquila via Vetoio 67010 Coppito L'Aquila Italia, Politecnico di Milano via Ponzio 34/3 20133 Milano, Italia, CH2873-8/90/0000-0235, 1990 IEEE, pp. 235-241.

* cited by examiner

*Primary Examiner*—Jessica Han
*Assistant Examiner*—Emily Pham
(74) *Attorney, Agent, or Firm*—Fogg & Powers LLC

(57) ABSTRACT

A current multiplier/divider-configured, feed-forward compensation circuit for a pulse width modulator (PWM) controller for a buck-mode DC-DC converter is operative to achieve constant loop gain irrespective of the magnitude of the input voltage, obviates the need for parameter calculations/adjustments of circuit components to conform with the PWM frequency selected by the user, and is effectively immune to variations in temperature and manufacturing process.

17 Claims, 2 Drawing Sheets

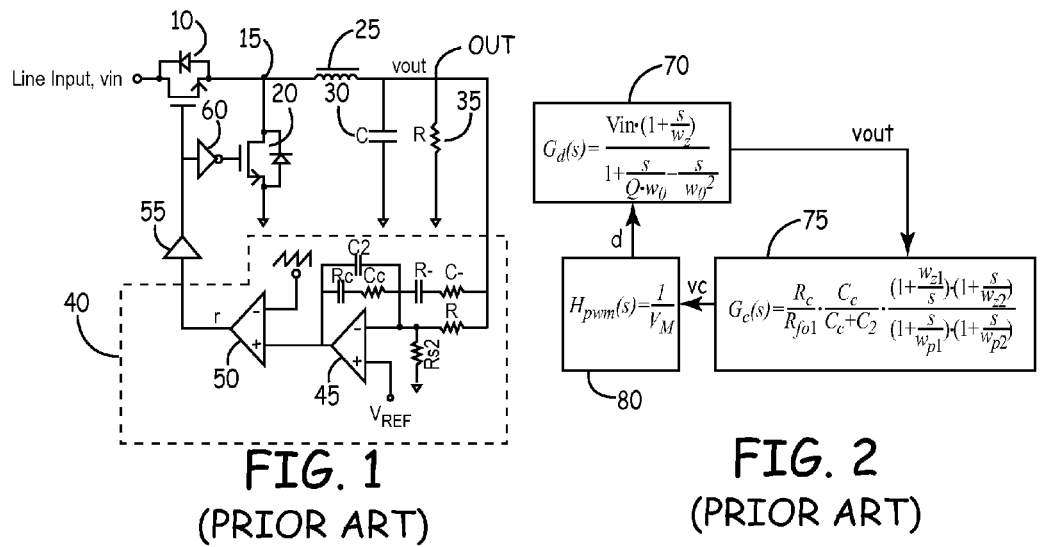
FIG. 1
(PRIOR ART)
FIG. 2
(PRIOR ART)
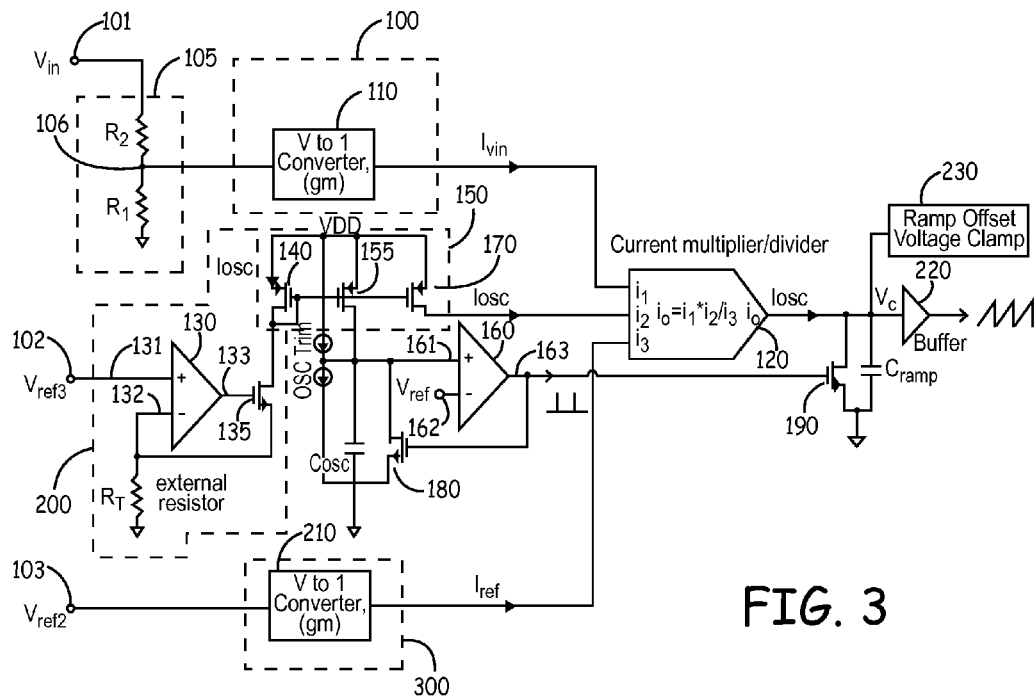
FIG. 3

CURRENT MULTIPLIER/DIVIDER-CONFIGURED FEED-FORWARD COMPENSATION FOR BUCK-MODE CONVERTER CONTROLLER WITH PROGRAMMED SWITCHING FREQUENCY

CROSS-REFERENCE TO RELATED APPLICATION

The present application claims the benefit of U.S. patent application Ser. No. 60/803,562, filed May 31, 2006, by Jun Xu, entitled: "Using A Current Multiplier/Divider to Implement Feed Forward Compensation For Voltage-Mode Buck Controller With Programmable Switching Frequency," assigned to the assignee of the present application and the disclosure of which is incorporated herein.

FIELD OF THE INVENTION

The present invention relates in general to DC power supply systems and subsystems thereof, and is particularly directed to a current multiplier/divider-configured, feed-forward compensation circuit for a programmable frequency, pulse width modulator (PWM) controller for a buck-mode DC-DC converter, that not only provides constant loop gain irrespective of the magnitude of the input voltage, but requires no parameter calculations/adjustments of circuit components to conform with the PWM frequency selected by the user, and is effectively independent of variations in temperature and manufacturing process.

BACKGROUND OF THE INVENTION

DC-DC converters are commonly used to supply DC power to a variety of electronic systems and devices, such as, but not limited to relatively low voltage circuits, such as personal computers and portable digital assistants, as well as high voltage integrated circuits (e.g., automotive electronic subsystems) and the like, and are available in a variety of configurations for deriving a desired DC output voltage from a given source of DC input voltage. As a non-limiting example, the DC-DC converter may be configured as a voltage mode, buck architecture, such as that diagrammatically illustrated in FIG. 1, which is typically used in applications where the load current demand is relatively large.

In the buck mode converter architecture of FIG. 1, one or more power switches, shown as MOSFETs 10 and 20, have the (drain-source) current flow paths through coupled between a DC input voltage terminal to which a (line) input voltage Vin is applied, and a reference voltage terminal (e.g., ground (GND)). The common or phase node 15 between MOSFETs 10 and 20 is connected through an output inductor 25 to an output voltage node OUT, to which a storage capacitor 30 and the powered load/device (shown as a resistor 35) are connected. By controllably switching the power switches on and off, the upstream, or phase node, end of the output inductor is alternately connected between the DC input voltage Vin and the reference voltage (GND). This produces an alternately increasing and decreasing output current through the inductor to the output node OUT, which serves to deliver a prescribed DC output voltage to the load.

To regulate the DC output voltage, the converter also includes a voltage control loop, shown in broken lines 40. The voltage control loop includes an error amplifier 45, which is operative to compare a voltage representative of the voltage at the output node OUT with a reference voltage Vref, and to produce an error voltage in accordance with the difference between these two compared voltages. This error voltage is coupled to one input of a PWM comparator 50, a second input of which is coupled to receive a sawtooth voltage waveform. The output of PWM comparator 50 is a PWM waveform, the pulse width of which is defined in accordance with the crossings of the (threshold) level of the error voltage by the sawtooth voltage waveform.

The PWM voltage waveform output of the PWM comparator 50 is applied to driver circuits 55 and 60, which respectively control the turn on/off times of the MOSFET power switches 10 and 20. To meet the demand for substantial load current, the PWM voltage waveforms that control the on/off switching of the power switches 10 and 20 are typically mutually complementary, as in the case of driver circuits 55 and 60, so that a conductive path from one or the other of the input voltage source Vin and ground will be continuously provided through one or the other of the power switches to the output inductor. This mode of operation is customarily referred to as continuous conduction mode (CCM).

As shown in the functional block diagram of FIG. 2, the control loop transfer function for the converter of FIG. 1 includes a gain $G_d(s)$ block 70, from which the output voltage Vout is derived, a feedback gain $G_c(s)$ block 75 from which a correction voltage Vc is derived, and a PWM drive $H_{pwm}(s)$ block 80, having a fixed gain $1/V_M$, that closes the loop from the feedback gain $G_c(s)$ block 75 to the gain $G_d(s)$ block 70. An examination of FIG. 2, in reveals that the control loop transfer function is proportional to the line input voltage Vin, as set forth in the gain $G_d(s)$ block 70. As a consequence, it has been customary practice to provide loop compensation in the feedback gain $G_c(s)$ block 75 in the form of the resistor-capacitor compensation network that is coupled with the error amplifier.

Unfortunately, because the parameters of such a loop compensation network are tailored for a prescribed value of the input voltage Vin, the control loop suffers degradation if the converter is powered by a substantially different value of line voltage. For example, if the loop compensation resistor-divider network is designed for an input voltage on the order of twelve volts, as a proximate median between a relatively low voltage value (e.g., on the order of six volts) and a relatively high voltage value (e.g., on the order of twenty-four volts), loop response will suffer as the input voltage is either reduced to a relatively low voltage value or increased to a relatively high voltage value.

To remedy this problem, a variety of feed-forward compensation schemes have been proposed. Although these conventional feed-forward compensation networks serve to make the loop transfer function independent of the input voltage, they do not provide a loop gain that is independent of the frequency of the PWM controller's sawtooth voltage waveform, which is not a fixed parameter, but is selected or programmed by the user (usually by way of an external trimming resistor). Instead, the instruction documentation for such controllers requires the user to perform mathematical calculations based upon a number of operational parameters, including the selected switching frequency, for defining the values of one or more additional (resistor and/or capacitor) components, which must be installed before using the controller.

SUMMARY OF THE INVENTION

In accordance with the present invention, these and other drawbacks of conventional feed-forward compensation networks for a programmable frequency, PWM controller of a buck-mode DC-DC converter are effectively obviated by a current multiplier/divider-configured, feed-forward compensation circuit. The use of a current multiplier/divider facilitates the generation of a ramp current, from which a sawtooth waveform voltage for the PWM control loop is derived, as a product/division combination of multiple (three) current components produced by three respective voltage-to-current converter stages.

A first of these voltage-to-current converter stages generates a first current Ivin representative of a voltage-divided fraction of the input voltage. The second voltage-to-current converter stage generates a second current Iosc derived from a stable voltage reference and a user-programmable resistor that is used in combination with a switchably discharged capacitor to define the switching frequency of the sawtooth voltage waveform. As the capacitor is periodically charged by the second current Iosc, and discharged by a controlled switch, it provides a periodic pulse signal waveform, that controls a discharging switch connected across a ramp capacitor, which is charged by the output (ramp) current Irmp of the current multiplier/divider. The third voltage-to-current converter stage generates a third, fixed current Iref in accordance with a highly stable voltage reference.

The current multiplier/divider may be implemented by an interconnected circuit arrangement of bipolar transistors to which the three currents Ivin, Iosc and Iref are supplied. The circuit connections of these transistors causes the collector current of an output transistor, which is the ramp current Irmp, to correspond to the product of the first current Ivin and the second current Iosc, divided by the third current Iref. Namely, Irmp=Ivin*Iosc/Iref. The resulting voltage waveform produced across the ramp capacitor is the desired sawtooth waveform.

By matching prescribed parameters of these three voltage-to-current converter stages, associated variables in the numerator and denominator of product/division transfer function performed by the current multiplier-divider cancel one another, so that the output sawtooth voltage waveform to have a peak-to-peak amplitude Vpp that can be expressed as a relatively simple relationship: Vpp ={R1/(R1+R2)}*Vin, where R1 and R2 are the values of the resistors of the voltage divider by way of which the input voltage Vin is coupled to the first voltage-to-current converter stage. This relatively simple expression reveals that the peak-to-peak amplitude Vpp of the sawtooth voltage waveform is proportional to input voltage Vin, is independent of the user-programmable clock frequency, and requires no parameter calculations or adjustments of circuit components to conform with the PWM frequency programmed by the user. In addition, as geometries of all like configured integrated circuit components, such as, but not limited to passive components, including resistors and capacitors, as well as active components, including bipolar and MOS devices, are affected in the same manner by any variations in processing parameters or temperature, geometry ratios of components that are subjected to such variations will mutually cancel, making the expression for Vpp effectively independent of process and temperature variations.

Since, by definition, the PWM modulator gain (corresponding to the PWM drive $H_{pwm}(s)$ block 80 of FIG. 1) is the complement of the expression for Vpp, then $H_{pwm}(s)$ may be expressed as: $H_{pwm}(s)=\{(R1+R2)/R1\}/Vin$. Thus, the closed loop transfer function of a DC-DC converter employing the current multiplier/divider-configured, feed-forward compensation circuit of the present invention includes a PWM drive function $H_{pwm}(s)$ that is proportional to 1/Vin, so that its product with the gain function $G_d(S)$, which is proportional to Vin, as described above with reference to the control loop transfer function diagram of FIG. 2, causes the Vin components to cancel one another—making the loop gain independent of Vin—as intended. In addition, the PWM drive function drive function $H_{pwm}(s)$ is reduced to a relatively simple expression, that allows the loop gain to be readily adjusted, by simply choosing the values of the voltage divider resistors R1 and R2 in the gain ratio (R1+R2)/R1.

BRIEF DESCRIPTION OF THE DRAWINGS

FIG. 1 diagrammatically illustrates the general architecture of a voltage-mode, buck DC-DC converter and PWM control loop therefor;

FIG. 2 is a functional block diagram of the PWM control loop transfer function for the DC-DC converter of FIG. 1;

FIG. 3 diagrammatically illustrates a current multiplier/divider-configured, feed-forward compensation circuit for a programmable frequency, PWM controller for a buck-mode DC-DC converter in accordance with the present invention;

DETAILED DESCRIPTION

Figure 4:
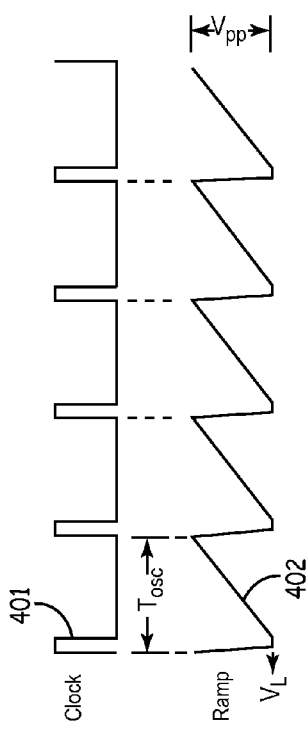
FIG. 4 shows waveform diagrams associated with the operation of the current multiplier/divider-configured, feed-forward compensation circuit of the present invention.

Before describing the current multiplier/divider-configured, feed-forward compensation circuit in accordance with the present invention, it should be observed that the invention resides primarily in a modular arrangement of conventional power supply circuits and electronic signal processing circuits and components therefor. In a practical implementation that facilitates packaging in a hardware-efficient equipment configuration, these modular arrangements may be readily implemented as field programmable gate array (FPGA)-, or application specific integrated circuit (ASIC)-based chip sets. Consequently, the configuration of this modular arrangement of circuits and components and the manner in which they are interfaced with one another have, for the most part, been illustrated in the drawings by readily understandable block and schematic diagrams, and associated signal waveforms, which show only those specific details that are pertinent to the present invention, so as not to obscure the disclosure with details which will be readily apparent to those skilled in the art having the benefit of the description herein. In the Figures, like numbers refer to like elements throughout.

Attention is now directed to FIG. 3, which diagrammatically illustrates the overall architecture of a non-limiting, but preferred embodiment of the current multiplier/divider-configured, feed-forward compensation circuit of the present invention. As pointed out briefly above, the current multiplier/divider is used to combine three separate current components produced by three respective voltage-to-current converter stages. A first of these voltage-to-current converter stages generates a first current based upon the input voltage Vin; a second voltage-to-current converter stage generates a second current based upon the frequency of the switching frequency (as programmed by the user); while a third voltage-to-current converter stage generates a third, fixed current in accordance with fixed voltage reference input.

As mentioned previously, and as will be detailed below, by matching prescribed parameters of these three voltage-to-current converter stages, associated variables in the numerator and denominator of product/division function performed by the current multiplier-divider cancel one another, so that a ramp current Irmp produced by the current multiplier/divider, and used to charge a capacitor (that is periodically discharged by a periodic pulse signal), will produce a sawtooth voltage waveform having a peak-to-peak amplitude that conforms with desired performance criteria. In particular, the resulting sawtooth voltage produced by the ramp current Irmp will have a peak-to-peak amplitude that: 1—is proportional to the input voltage (so as to achieve constant loop gain irrespective of the magnitude of the input voltage); 2—is independent of the user-programmable clock frequency (as defined by a user-selected value of an external programming component (resistor)); 3—requires no parameter calculations or adjustments of circuit components to conform with the PWM frequency selected by the user; and 4—is effectively independent of variations in temperature and manufacturing process.

To this end, a first voltage-to-current converter stage 100 of the current multiplier/divider-configured, feed-forward compensation circuit of FIG. 3 is shown as having an input terminal 101, to which the input or line voltage Vin is coupled. Input terminal 101 is connected to one end of a voltage divider network 105 comprised of resistors R1 and R2 connected in series between the input terminal 101 and ground. A voltage dividing node 106 between resistors R1 and R2 supplies a fractional (R2/(R1+R2)) portion of the input voltage Vin to a transconductance amplifier stage 110, which outputs a current Ivin proportional to the fraction of the input voltage supplied thereto. This first, input voltage-representative, current Ivin is coupled to a first current input I1 of a (log/anti-log) current multiplier/divider 120 (shown in greater detail in FIG. 3, to be described).

A second voltage-to-current converter stage 200 has an input terminal 102 coupled to receive a prescribed stable, reference voltage Vref3, such as that supplied by a bandgap reference. This reference voltage Vref3 is coupled to a first, non-inverting (+) input 131 of an operational amplifier 130, which has a second, inverting (−) input 132 thereof coupled through an external resistor RT to ground. External resistor RT is programmed or selected by the user to set the oscillation frequency of the PWM controller, as will be described. The output 133 of amplifier 130 is coupled to the gate of a MOSEET 135, the source of which is coupled to the connection of the external resistor RT to the inverting input 132 of amplifier 130 and the drain of which is coupled to the commonly connected drain and gate terminals of a current mirror input MOSFET 140 of a current mirror 150. The source terminal of MOSFET 140 is referenced to a prescribed supply rail voltage (VDD). Amplifier 130 and MOSFET 135 driven thereby serve to provide a substantially constant oscillator reference current Iosc, that is based upon the value of the programmed reference resistor RT and the reference voltage Vref3.

The current Iosc is mirrored by a first current mirror output MOSFET 155 into a capacitor Cosc that is connected between the non-inverting (+) input 161 of a comparator 160 and ground, and by a second current mirror output MOSFET 170 into a second current input I2 of the current multiplier/divider 120. The inverting (−) input 162 of comparator 160 is coupled to receive a stable reference voltage Vref1 which, like reference voltage Vref3, may be supplied by a bandgap reference. A MOSFET switch 180 has its source-drain path coupled across capacitor Cosc and its gate input coupled to the output 163 of comparator 160. As capacitor Cosc is charged by the current Iosc mirrored by current mirror output MOSFET 155, the voltage thereacross eventually reaches the value of the reference voltage Vref1, which causes the output 163 of comparator 160 to trip or change state (e.g., go from low to high), which turns on MOSFET switch 180, and thereby provides a discharging short across for capacitor Cosc. As capacitor Cosc discharges through the turned-on MOSFET switch 180, the voltage across capacitor Cosc eventually drops below the value of the reference voltage Vref1, when this happens, the output 163 of comparator 160 change to the opposite state (e.g., goes from high to low), which turns off MOSFET switch 180, and thereby allows capacitor Cosc to be recharged by the current Iosc mirrored by current mirror output MOSFET 155.

The repetitive change in state of the output 163 of comparator 160, as capacitor Cosc is periodically charged by the current Iosc, and discharged by MOSFET switch 180, provides a periodic pulse signal waveform, shown at 401 in the waveform diagram of FIG. 4. This pulse signal is coupled to the gate of controlled discharging MOSFET switch 190, the source-drain path of which is connected across a ramp capacitor Cramp, connected between the output of current multiplier/divider 120 and ground. The value of the ramp capacitor Cramp is made equal to the value of the capacitor Cosc. As will be described with reference to FIG. 5, this matching of Cramp and Cosc, coupled with the matching of the values of other parameters of the current multiplier/divider-configured, feed-forward compensation circuit of the invention, results in a sawtooth voltage waveform having the above-referenced peak-to-peak amplitude performance criteria. The period (Tosc) of periodic pulse signal waveform 401 produced at the output of comparator 160, as well as the period of an associated sawtooth waveform developed across ramp capacitor Cramp in response to this pulse signal waveform, is governed by the rate at which capacitor Cosc is repetitively charged and discharged, which, in turn, is governed by the magnitude of the current Iosc, as programmed by the value of the external resistor RT. In particular, Tosc=Cosc*Vref1/Iosc.

A third voltage-to-current converter stage 300 has an input terminal 103 coupled to receive a prescribed stable, reference voltage Vref2, such as that supplied by a bandgap reference. This reference voltage Vref2 is coupled to a transconductance amplifier stage 210, which outputs a current Iref to a third current input I3 of the current multiplier/divider 120. As will be described with reference to FIG. 5, the value of a reference resistor that is used to establish the voltage-to-current conversion ratio of transconductance amplifier 210 is matched with the value of a reference resistor that is used to establish the voltage-to-current conversion ratio of the transconductance amplifier 110 of the first voltage-to-current converter stage 100. In addition, the value of the reference voltage Vref2 is matched with the value of the reference voltage Vref1 that is coupled to the inverting (−) input 162 of comparator 160. This matching of reference resistors and reference voltages, coupled with the matching of capacitors Cramp and Cosc, described above, produces the intended sawtooth voltage waveform output, as will be readily understood from the schematic diagram FIG. 5, to be described.

Current multiplier/divider 120 (to be described in detail below with reference to the schematic diagram of FIG. 5), is operative to combine the three input currents Ivin, Iosc and Iref, respectively supplied to its inputs I1, I2 and I3 by the voltage-to-current converter stages 100, 200 and 300, in accordance with a prescribed log/anti-log multiplication and division relationship and to produce therefrom an output current Io=Irmp, which is used to charge ramp capacitor Cramp.

From inspection, it can be seen that the peak-to-peak amplitude Vpp of the resulting periodic sawtooth voltage waveform, that is developed across capacitor Cramp in accordance with the charging current Irmp produced by current multiplier/divider 120 and the discharging pulse waveform supplied by comparator 160 to the gate terminal of MOSFET switch 190, corresponds to the product of the current Irmp and the period Tosc of the switching frequency of the discharging pulse waveform, divided by the value of the ramp capacitor Cramp. Namely, Vpp Irmp*Tosc/Cramp.

The sawtooth voltage waveform developed across capacitor Cramp is coupled by way of an output buffer 220 to a sawtooth voltage output terminal SAW-OUT, that couples the sawtooth voltage waveform to the error amplifier of the feedback loop, as described previously with reference to FIG. 1. In addition, a ramp offset voltage clamp circuit 230 is coupled to the input of the buffer amplifier. As a result of this clamp circuit, the output of buffer 220 has the sawtooth voltage characteristic shown at 402 in the waveform diagram of FIG. 4, having a peak-to-peak voltage amplitude Vpp relative to a ramp offset voltage VL.

Figure 5:
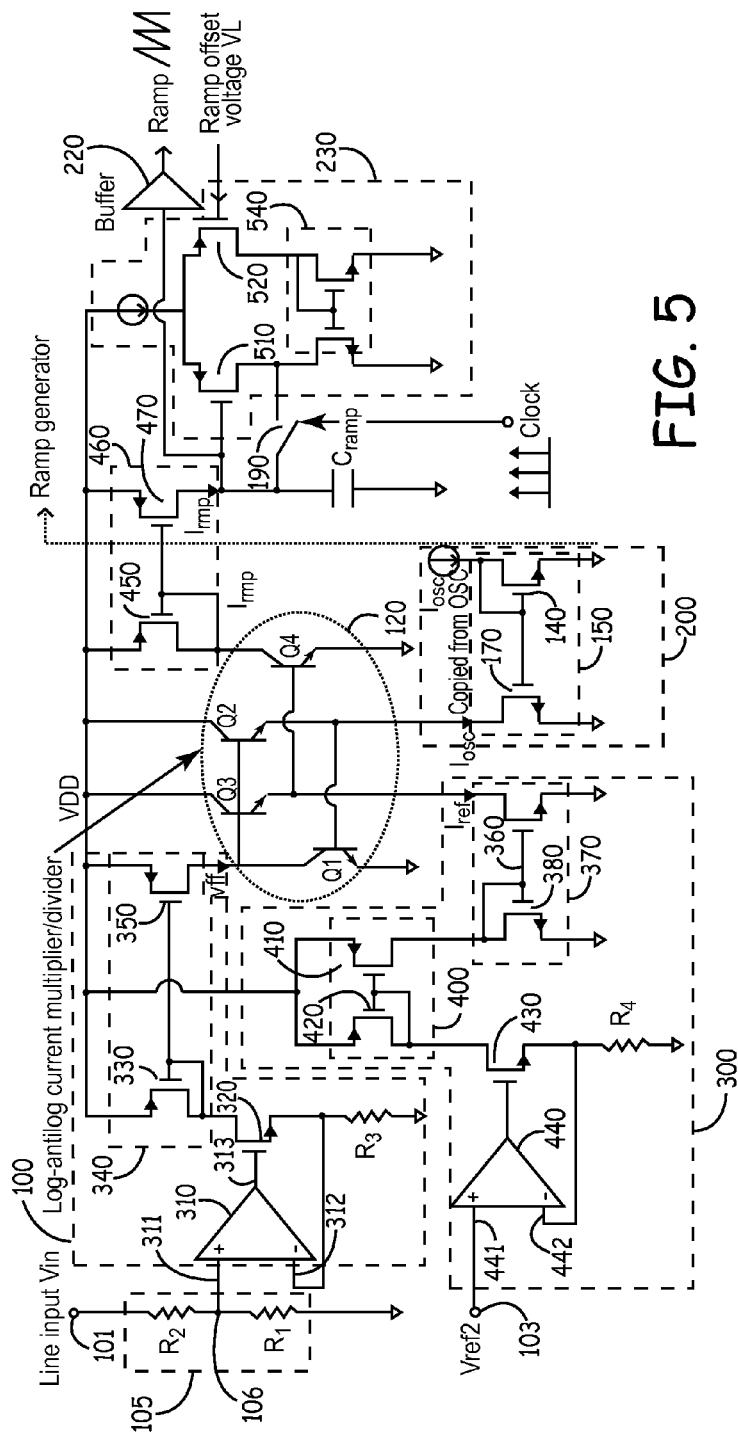
FIG. 5 is a detailed schematic illustration of the current multiplier/divider and other portions of the feed-forward compensation circuit of FIG. 3.

Attention is now directed to FIG. 5, which shows a detailed schematic illustration of the current multiplier/divider circuitry of FIG. 3. As shown therein, the voltage dividing node 106 of the voltage divider network 105 to which the voltage input terminal 101 is connected is coupled to a first, non-inverting (+) input 311 of an operational amplifier 310, which has a second, inverting (−) input 312 thereof coupled through a reference resistor R3 to ground. The output 313 of amplifier 310 is coupled to the gate of a MOSFET 320, the source of which is coupled to the connection of resistor R3 to the inverting input 312 of amplifier 310 and the drain of which is coupled to the commonly connected drain and gate terminals of a current mirror input MOSFET 33.0 of a current mirror 340. The source terminal of MOSFET 330 is referenced to a prescribed supply rail voltage (VDD). Amplifier 310 and MOSFET 320 driven thereby serve to provide the current Ivin, that is based upon the value of the reference resistor R3 and the fraction of the input voltage Vin produced by the voltage dividing node 106 of voltage divider 105. In particular, current Ivin is defined in accordance with the expression: Ivin=Vin*(R1/(R1+R2))*(1/R3).

This current Ivin is mirrored by a current mirror output MOSFET 350 and supplied as a collector current $I_{Q1}$ to a first bipolar transistor Q1 of a plurality of matched (NPN) bipolar transistors Q1, Q2, Q3 and Q4, of which the log/anti-log current multiplier/divider 120 is comprised. The collector of bipolar transistor Q1 is further coupled to the bases of second and third respective bipolar transistors Q2 and Q3, and has its emitter coupled to ground and its base connected to the emitter of transistor Q2. The collector of bipolar transistor Q2 is referenced to Vdd and its emitter is further coupled to the current mirror output MOSFET 170 of the current mirror 150 shown in FIG. 3. As described above, current mirror output MOSFET 170 is coupled in current mirror configuration with the current mirror input MOSFET 140, to which the current Iosc provided by MOSFET 135 of the circuit of FIG. 3 is supplied.

Like the second bipolar transistor Q2, the third bipolar transistor Q3 has its collector coupled to Vdd. The emitter of transistor Q3 is coupled to receive the reference current Iref from the drain of a current mirror output MOSFET 360 of a current mirror 370, which has a current mirror input MOSFET 380 thereof coupled to the current mirror output MOSFET 410 of a current mirror 400. Current mirror 400 has a current mirror input MOSFET 420 coupled to the drain of a MOSFET 430, the source of which is coupled to a reference resistor R4, coupled to ground, and the inverting (−) input 442 of an operational amplifier 440. Amplifier 440 has the non-inverting (+) input 441 thereof coupled to receive the reference voltage Vref2 at the input terminal 103 of the third voltage-to-current converter stage which, as shown in broken lines 300, includes amplifier 440, MOSFET 430 and current mirrors 400 and 370.

The emitter of bipolar transistor Q3 of the current multiplier/divider 120, to which the reference current Iref is supplied by current mirror 370, is further coupled to the base of a fourth bipolar transistor Q4, the emitter of which is coupled to ground. As will be described, the collector of the fourth bipolar transistor Q4 is operative to produce the ramp current Irmp, as a product of the current Ivin and the current Iosc, divided by the current Iref. This collector current Irmp of transistor Q4 is coupled to a current mirror input MOSFET 450 of a current mirror 460, a current mirror output MOSFET 470 of which is coupled to the capacitor 190, the input to output buffer 220 and to one input of ramp offset voltage clamp circuit 230, shown as comprising a pair of MOSFETs 510 and 520 connected in differential amplifier configuration between current sources 530 and 540, that are respectively referenced to Vdd and ground. The gate input to MOSFET 520 is coupled to receive a ramp offset voltage VL, while the gate input to MOSFET 510 is coupled to the input to output buffer 220. The source-drain path of MOSFET switch 190 is coupled between capacitor Cramp and the drain of MOSFET 510 of ramp offset voltage clamp circuit 230.

The current multiplier/divider circuit 120 of FIG. 5 operates as follows. With bipolar transistors Q1-Q4 being matched devices, from inspection, it can be seen that the sum of the base-emitter voltage Vbe1 and Vbe2 between ground and the base of transistor Q2 is equal to the sum of the base-emitter voltage Vbe3 and Vbe4 between ground and the base of transistor Q3. This relationship and the circuit connections of transistors Q1-Q4, described above, causes the collector current Irmp of transistor Q4 to be the product of the current Ivin and the current Iosc, divided by the current Iref. Namely, Irmp=Ivin*Iosc/Iref.

As pointed out above, the first input current I1=Ivin to the current multiplier/divider 120, supplied by the drain of MOSFET 320 to current mirror 320 of the first voltage-to-current converter stage 100 and mirrored thereby to the collector of bipolar transistor Q1 and to the commonly connected bases of transistors Q2 and Q3, is defined in accordance with the expression: Ivin=Vin*(R1/(R1+R2))*(1/R3). The second current I2=Iosc, supplied by the current mirror 150 of the second voltage-to-current converter stage 200 to the commonly connected emitter of transistor Q2 and base of transistor Q1, is defined in accordance with the ratio of the reference voltage Vref3 and the external resistor RT. In addition, the current Iosc can be expressed as the product of the reference voltage Vref1 and the capacitor Cosc, divided by the period Tosc of the oscillator frequency (which is governed by the value of the reference voltage Vref3, capacitor Cosc, the user-programmable external resistor RT, and the reference voltage Vref1, as described above). Namely, the second current I2 (or Iosc)=Cosc*Vref1/Tosc. Finally, the third current I3=Iref, supplied by current mirror 370 to the commonly connected emitter of transistor Q3 and the base of transistor Q4, is defined in accordance with the ratio of the reference voltage Vref2 and the resistor R4. Namely I3 (or Iref)=Vref2/R4.

As noted above, the peak-to-peak amplitude Vpp is defined by the expression: Vpp=Irmp*Tosc/Cramp. Substituting the above expression Irmp=Ivin*Iosc/Iref and the expression Tosc=Cosc*Vref1/Iosc into this equation for Vpp yields: Vpp=(Cosc/Cramp)*(Ivin/Iref)*Vref1. Similarly, substituting the above expression Ivin=Vin*(R1/(R1+R2))*(1/R3)

and the expression Iref Vref2/R4 into this equation for Vpp yields the equation:

$$Vpp=\{Cosc/Cramp\}*\{R4/R3\}*\{R1/(R1+R2)\}*\{Vref1/Vref2\}*Vin.$$

By matching the respective values of the references resistors R3 and R4, the values of the capacitors Cosc and Cramp, and the values of the reference voltages Vref1 and Vref2, the above expression for Vpp can be reduced to the relatively simple equation:

$$Vpp=\{R1/(R1+R2)\}*Vin.$$

Such component matching is readily achieved in present-day integrated circuit manufacturing processes, in which geometries of all like configured components, such as, but not limited to passive components, including resistors and capacitors, as well as active components, including bipolar and MOS devices, are affected in the same manner by any variations in processing parameters or temperature. This means that the geometry ratios of components that are subjected to like variations (such as processing or temperature variations) will effectively mutually cancel, making the expression for Vpp effectively process and temperature variation immune.

Since, by definition, the PWM modulator gain Aosc (the PWM drive $H_{pwm}$ (s) block 80 of FIG. 1) is the complement of the expression for Vpp, then $H_{pwm}$ (s) may be expressed as:

$$H_{pwm}(s)=Aosc=\{(R1+R2)/R1\}/Vin.$$

Thus, the closed loop transfer function of a DC-DC converter employing the current multiplier/divider-configured, feed-forward compensation circuit of the present invention includes a PWM drive function $H_{pwm}$ (s) that is proportional to 1/Vin, so that its product with the gain function $G_d$ (S), which is proportional to Vin, as described above with reference to the control loop transfer function diagram of FIG. 2, causes the Vin components to cancel one another—making the loop gain independent of Vin—as intended; in addition, the PWM drive function drive function $H_{pwm}$ (s) is reduced to a relatively simple expression, that allows the loop gain to be readily adjusted, by simply choosing the values of the voltage divider resistors R1 and R2 in the gain ratio (R1+R2)/R1.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. A voltage mode DC-DC converter for supplying a regulated DC output voltage to a load comprising:
   an output power switching stage having power switches coupled between an input voltage terminal to which an input voltage Vin is applied, and a reference voltage terminal, and having a common node therebetween coupled by way of an output inductor to an output node from which said regulated DC output voltage is supplied;
   a control circuit for controlling switching of said power switches for voltage mode operation of said DC-DC converter; and
   a pulse width modulation (PWM) voltage waveform generator circuit, which is operative to generate a PWM voltage waveform, in response to which said control circuit controls switching of said power switches, said PWM voltage waveform generator including a current multiplier/divider that is operative to provide feed-forward compensation for a periodic voltage waveform used to generate said PWM voltage waveform, such that said periodic voltage waveform has a peak-to-peak amplitude Vpp that is proportional to said input voltage Vin, wherein said PWM voltage waveform generator circuit is operative to generate said periodic voltage waveform in accordance with an output current produced by said current multiplier/divider, and includes a first voltage-to-current converter stage that is operative to generate a first current Ivin representative of a voltage-divided fraction of said input voltage Vin, a second voltage-to-current converter stage that is operative to generate a second current Iosc derived from a stable voltage reference and a user-programmable circuit component that is used to define said frequency of said periodic voltage waveform, and a third voltage-to-current converter stage that is operative to generate a third, fixed current Iref, and wherein said current multiplier/divider is operative to produce said output current in accordance with a prescribed product/division of said first, second and third currents.

2. The voltage mode DC-DC converter according to claim 1, wherein said PWM voltage waveform generator circuit is operative to generate said periodic voltage waveform in accordance with the output current produced by said current multiplier/divider, such that said peak-to-peak amplitude Vpp of said periodic voltage waveform possesses at least one of the following characteristics: i- said peak-to-peak amplitude Vpp is independent of the frequency of said periodic voltage waveform, ii- said-to-peak amplitude Vpp requires no parameter calculations or adjustments of circuit components to conform with said frequency, and iii- said peak-to-peak amplitude Vpp is effectively independent of variations in temperature and manufacturing process.

3. The voltage mode DC-DC converter according to claim 1, wherein said current multiplier/divider comprises an interconnected circuit arrangement of transistors to which said first, second and third currents Ivin, Iosc and Iref are respectively supplied, and including an output transistor from which said output current is derived in accordance with a product of said first current Ivin and said second current Iosc, divided by said third current Iref.

4. The voltage mode DC-DC converter according to claim 1, wherein selected circuit parameters of said PWM voltage waveform generator are matched with one another so as to make said peak-to-peak amplitude of said periodic voltage waveform proportional to only said input voltage Vin.

5. The voltage mode DC-DC converter according to claim 1, wherein said PWM voltage waveform generator circuit further includes a controllably discharged output capacitor that is charged by said output current produced by said current multiplier/divider and is controllably discharged by a pulse signal waveform having said frequency of said periodic voltage waveform, so as to produce said periodic voltage waveform thereacross.

6. The voltage mode DC-DC converter according to claim 5, wherein said PWM voltage waveform generator includes a controllably discharged capacitor circuit having a reference capacitor that is charged by said second current Iosc, and is discharged in response to the voltage thereacross reaching a prescribed reference voltage, so as to produce said pulse signal waveform in accordance with repetitive charging and discharging of said reference capacitor, and wherein said periodic voltage waveform is a sawtooth voltage waveform that is developed across said output capacitor as said output capacitor is periodically charged by said output current produced by said current multiplier/divider and discharged by said pulse signal waveform.

7. The voltage mode DC-DC converter according to claim 6, wherein said current multiplier/divider comprises an interconnected circuit arrangement of transistors to which said first, second and third currents Ivin, Iosc and Iref are respectively supplied, and including an output transistor from which said output current is derived in accordance with a product of said first current Ivin and said second current Iosc, divided by said third current Iref.

8. The voltage mode DC-DC converter according to claim 7, wherein selected circuit parameters of said PWM voltage waveform generator are matched with one another so as to make said peak-to-peak amplitude of said periodic voltage waveform proportional to only said input voltage Vin.

9. In a voltage mode DC-DC converter for supplying a regulated DC output voltage to a load and including a pulse width modulation (PWM) voltage waveform generator circuit, which is operative to generate a PWM voltage waveform, in response to which a control circuit controls the operation of power switches that supply current, derived from an input voltage Vin coupled thereto, through an inductor to a load, the improvement wherein said PWM voltage waveform generator comprises a current multiplier/divider that is operative to provide feed-forward compensation for a periodic voltage waveform used to generate said PWM voltage waveform, such that said periodic voltage waveform has a peak-to-peak amplitude Vpp proportional to said input voltage Vin, wherein said PWM voltage waveform generator circuit is operative to generate said periodic voltage waveform in accordance with an output current produced by said current multiplier/divider, and includes a first voltage-to-current converter stage that is operative to generate a first current Ivin representative of a voltage-divided fraction of said input voltage Vin, a second voltage-to-current converter stage that is operative to generate a second current Iosc derived from a stable voltage reference and a user-programmable circuit component that is used to define said frequency of said periodic voltage waveform, and a third voltage-to-current converter stage that is operative to generate a third, fixed current Iref, and wherein said current multiplier/divider is operative to produce said output current in accordance with a prescribed product/division of said first, second and third currents.

10. The improvement according to claim 9, wherein said peak-to-peak amplitude Vpp of said periodic voltage waveform is proportional to only said input voltage Vin.

11. The improvement according to claim 9, wherein said PWM voltage waveform generator circuit is operative to generate said periodic voltage waveform in accordance with then output current produced by said current multiplier/divider, such that said peak-to-peak amplitude Vpp of said periodic voltage waveform possesses at least one of the following characteristics: i- said peak-to-peak amplitude Vpp is independent of the frequency of said periodic voltage waveform, ii- said peak-to-peak amplitude Vpp requires no parameter calculations or adjustments of circuit components to conform with said frequency, and iii- said peak-to-peak amplitude Vpp is effectively independent of variations in temperature and manufacturing process.

12. The improvement according to claim 9, wherein said current multiplier/divider comprises an interconnected circuit arrangement of transistors to which said first, second and third currents Ivin, Iosc and Iref are respectively supplied, and including an output transistor from which said output current is derived in accordance with a product of said first current Ivin and said second current Iosc, divided by said third current Iref.

13. The improvement according to claim 9, wherein selected circuit parameters of said PWM voltage waveform generator are matched with one another so as to make said peak-to-peak amplitude of said periodic voltage waveform proportional to only said input voltage Vin.

14. The improvement according to claim 9, wherein said PWM voltage waveform generator circuit further includes a controllably discharged output capacitor that is charged by said output current produced by said current multiplier/divider and is controllably discharged by a pulse signal waveform having said frequency of said periodic voltage waveform, so as to produce said periodic voltage waveform thereacross.

15. The improvement according to claim 14, wherein said PWM voltage waveform generator includes a controllably discharged capacitor circuit having a reference capacitor that is charged by said second current Iosc, and is discharged in response to the voltage thereacross reaching a prescribed reference voltage, so as to produce said pulse signal waveform in accordance with repetitive charging and discharging of said reference capacitor, and wherein said periodic voltage waveform is a sawtooth voltage waveform that is developed across said output capacitor as said output capacitor is periodically charged by said output current produced by said current multiplier/divider and discharged by said pulse signal waveform.

16. A method of controlling the operation of a pulse width modulation (PWJ) voltage waveform generator circuit for a voltage mode DC-DC converter, that includes power switches controlled by a PWM signal produced by said PWM voltage waveform generator, so as to supply current, derived from an voltage Vin to which said power switches are coupled, through an inductor to a load, so as to supply a regulated DC output voltage to said load, said method comprising the steps of:
(a) generating a periodic voltage waveform in response to an output current produced by a current multiplier/divider in accordance with said input voltage Vin; and
(b) causing said PWM voltage waveform generator to generate said PWM signal in accordance with said periodic voltage waveform generated in step (a), wherein said current multiplier/divider includes a first voltage-to-current converter stage that is operative to generate a first current Ivin representative of a voltage-divided fraction of said input voltage Vin, a second voltage-to-current converter stage that is operative to generate a second current Iosc derived from a stable voltage reference and a user-programmable circuit component that is used to define said frequency of said periodic voltage waveform, and a third voltage-to-current converter stage that is operative to generate a third, fixed current Iref, and wherein said current multiplier/divider is operative to produce said output current in accordance with a prescribed product/division of said first, second and third currents.

17. The method according to claim 16, wherein step (a) comprises establishing operational parameters of said current multiplier/divider that cause said periodic voltage waveform to have a peak-to-peak amplitude Vpp that is proportional to only said input voltage Vin, and possesses at least one of the following characteristics: i- said peak-to-peak amplitude Vpp is independent of the frequency of said periodic voltage waveform, ii- said peak-to-peak amplitude Vpp requires no parameter calculations or adjustments of circuit components to conform with said frequency, and iii- said peak-to-peak amplitude Vpp is effectively independent of variations in temperature and manufacturing process.

\* \* \* \* \*